United States Patent

[11] 3,571,948

| | | | |
|---|---|---|---|
| [72] | Inventor | John T. Heffernan | |
| | | 30 Brigham Road, Worcester, Mass. 01609 | |
| [21] | Appl. No. | 832,621 | |
| [22] | Filed | June 12, 1969 | |
| [45] | Patented | Mar. 23, 1971 | |

[54] ECONOMICS TEACHING DEVICE
7 Claims, 4 Drawing Figs.

[52] U.S. Cl. ............................................. 35/24, 35/34
[51] Int. Cl. ..................................... G09b 19/18, G09b 23/04
[50] Field of Search............................... 35/24, .4, .6, 30, 34

[56] References Cited
FOREIGN PATENTS
556,775    2/1957    Italy ........................... 35/34

*Primary Examiner*—W. H. Grieb
*Attorney*—Allan R. Redrow

ABSTRACT: A teaching device for visually representing equations in a three-dimensional relationship including means to effect adjustment of a variable to demonstrate the continuous interplay of the elements of the equation as certain values change. The device is particularly useful for visually illustrating the relationships of basic units in economic theories under conditions of continuous variation of different aspects of the economic data.

PATENTED MAR 23 1971 3,571,948

INVENTOR
JOHN T. HEFFERNAN
BY
ATTORNEY

INVENTOR
JOHN T. HEFFERNAN
BY
*Allan P. Redrow*
ATTORNEY

ECONOMICS TEACHING DEVICE

BACKGROUND OF THE INVENTION

While visual teaching aids have been known for many years, the teachers in the field of economics have been unable to adapt them to a number of their activities. U.S. Pat. No. 1,981,646 to Hamley, Nov. 20, 1934, shows a device for teaching mathematics and exhibiting mathematical problems. Basically, economic theory can be illustrated by an algebraic equation and the present device makes use of a basic concept like that of the Hamley patent. But, in the teaching of economic theory, the relationship of all the elements of the equation may not be readily apparent from the inspection of a static three-dimensional representation of that relationship and I have devised a way of visually illustrating for the student, the continuous interplay of the elements as one or two of the dependent or interrelated factors vary.

BRIEF DESCRIPTION OF THE INVENTION

My invention makes use of a transparent three-dimensional cubic chamber for visually representing economic theorems and the relationships of the dependent variables under changing conditions. In following my invention any of the theories of economics expressed in terms of three linear, as well as some nonlinear variables may be illustrated and the resolution of the equation can be visually produced within the cube so that the student can get a better grasp of the concept and the effect on other factors produced by changing the value of one of the dependent variables.

My generally cubical display chamber has an open front. The top, bottom, back and sidewalls are perforated each in a uniform pattern so that in effect a line can be stretched from an aperture in one wall to an aperture in another wall to represent a two-dimensional straight line function. A three-dimensional representation may be created by stretching succeeding lines across the inside of the cube from the back wall toward the front to show the overall pattern resulting from successive variations of three elements of an equation that represents an economic theory or rule. In addition to using my device for developing a visual representation of equations that typify such economic patterns, I have introduced a further means to manipulate the dependent variables that are represented within the cube to demonstrate a change in the relationships of the dependent elements of the equation one upon the other as the values of one of the variables changes.

IN THE DRAWINGS

Figure 1:
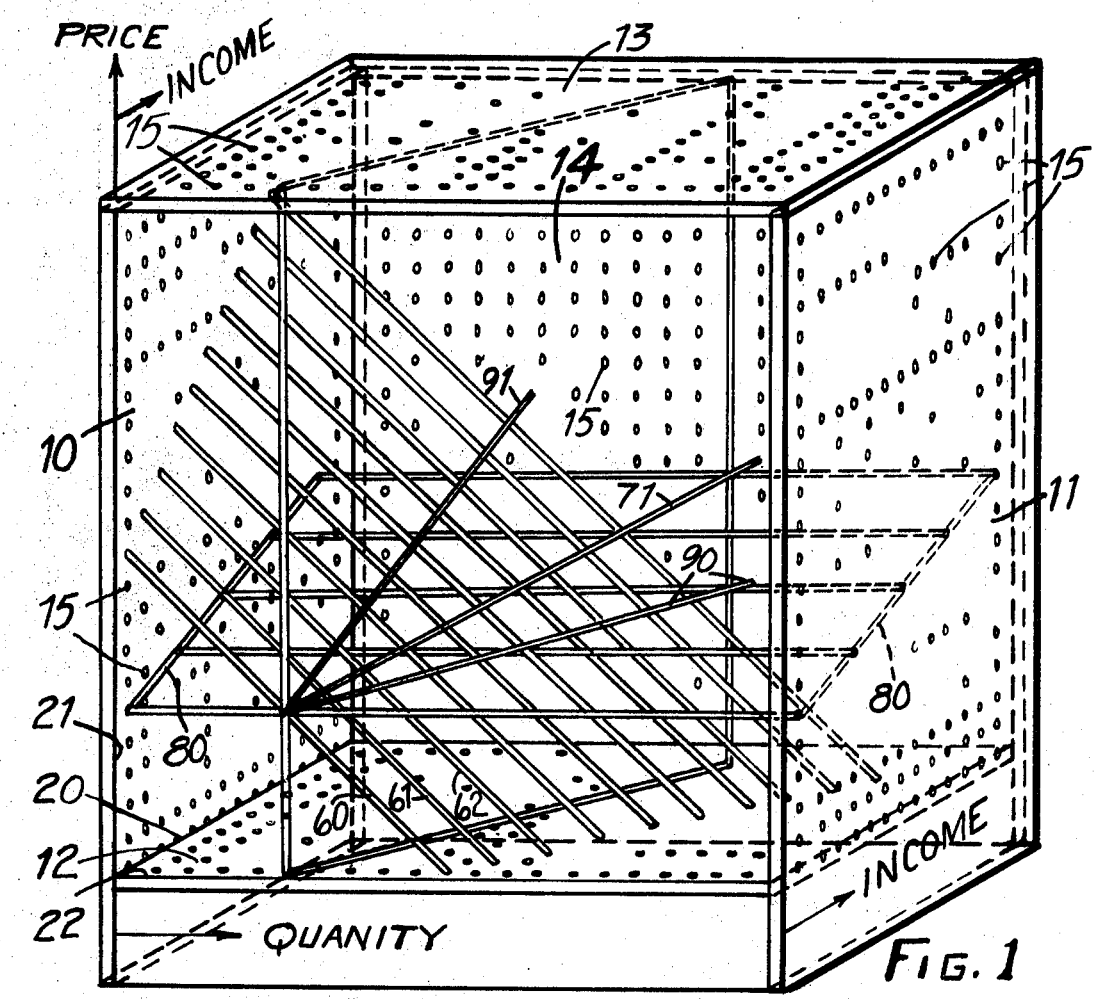
FIG. 1 is a perspective view of the basic concept of my invention.

The basic cube forming the substance of my invention is constructed of transparent walls including sidewalls 10 and 11, bottom wall 12, top wall 13 and backwall 14. The walls are filled with perforations 15 the perforations being equidimentionally spaced from one another in each wall and from wall to wall, in order that the units can be easily counted off to form a graphic reproduction of a given algebraic equation within the cube. Thus, it can be seen that if a linear relationship is to be represented in the box, the three dimensions of the cube as represented by the lines 20 at the intersection of the bottom 12 and sidewall 10, the vertical front edge 21 of wall 10 and the front edge 22 of bottom 12 can be designated to form the axes about which a three-dimensional representation of a cubic equation can be constructed.

In its simplest form, three-dimensional linear relationships can be illustrated visually by threading a yarn from a designated hole in one wall and then drawing it taut through a hole in another wall in accordance with the relationship defined by the linear or other equation under study. As the variables change year by year for example, one year's relationship can be placed successively in front of the previous year's activity whereby a three-dimensional picture of a number of interdependent data can be visually constructed to demonstrate the theorem under discussion.

Figure 2:
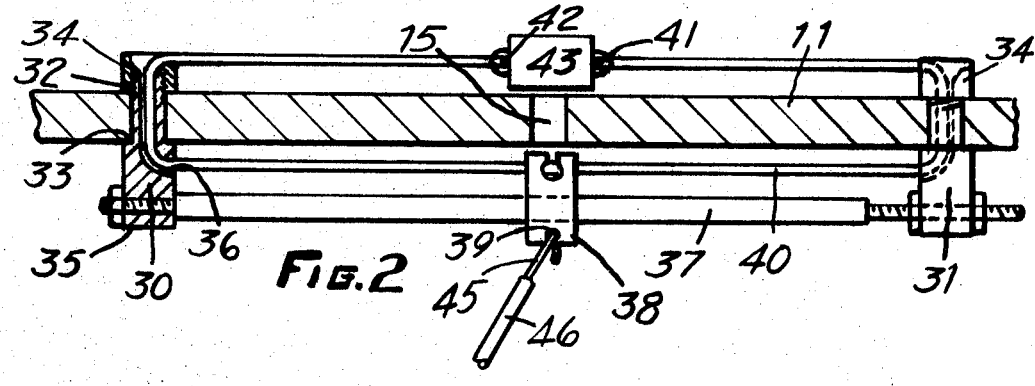
FIG. 2 is a detailed illustration partly broken away showing the means for adjusting the line representing one of the variable units.

To aid the professor in the study of the illustrated principle, and particularly to instantaneously illustrate the effect of changing the value of one or two factors and noting the changes thus produced in the overall picture, I make use of the structure shown FIG. 2. Preferably, this mechanism provides an endless belt means adapted to be mounted on any one or on the opposite walls of the cube for supporting the end of a taut resilient element 46 described hereinafter that is stretched from one value indication on one wall to another value indication on another wall to illustrate the linear function in a given equation. By moving either one or both of the belts on the opposite walls to effect a change in the position of the attached end of the stretched element in accordance with the defined interdependent interplay of the factors, the relationship of the changing values of one or more factors to other data built into the three-dimensional representation, can be made visually apparent.

Referring to the detailed view of the endless belt mechanism shown in FIG. 2, the preferred form includes two identical support elements 30 and 31 that are adapted to fit into spaced-apart apertures 15 in wall 11. Each of the support elements is hollow and has a threaded portion 32 and a collar 33. The threaded portion is just long enough to reach through the wall and cooperates with a threaded nut element 34 that fixedly draws the collar 33 on each support element tight against the inside of a wall such as 11 of the cube. Each support is provided with an aperture 36 which communicates with the hollow center portion of the support, just behind collar 33. Also, the support elements are each designed so that the free end 35 of the element is apertured to receive a threaded end of a rod 37 that may be engaged in the support by a cooperating nut.

Any number of the support and connecting rod elements described above may be fixedly assembled on the inside of the walls of the cube, usually in oppositely disposed pairs. When so assembled, the free ends of a somewhat resilient belt 40 may be threaded through the hollow support elements 30 and openings 36. The loose ends 41 and 42 of the belt may then be hooked onto the opposite sides of a finger gripper 43 that may be operated manually to cause the endless belt so formed to slide around the loop thus produced. A slider 38 is provided that engages on rod 37 and moves with the belt. The slider may be frictionally mounted to be driven up and down rod 37 as the finger grip 43 is moved and the slider has an aperture 39 in its free end to receive the hook 45 attached to one end of the resilient element 46 that may be stretched taut across the inside of the cube to illustrate the variable function. The other end of element 46 may be engaged in an aperture 15 in wall 10 for example or have its other end hooked into an aperture 39 of another slider mounted on an identical endless belt, rod and support assembly affixed to wall 10. It is evident that the belt 40 may be oscillated in its track by this device, to cause the slider 38 to move down and up along rod 37. The movement of the slider causes the end 45 of the resilient element 46 to change its position so that 46 is stretched or contracted to illustrate a straight line that always connects the two points between which the element 46 is stretched.

The rods 37 can be provided in different lengths to span any given number of holes either horizontally, vertically, or at an angle along the wall on which the endless belt means of FIG. 2 is to be mounted. Suitable belts 40 can also be provided to fit any length of loop needed in order to have a freely moving belt assembly to operate slider 38 along rod 37. The belts 40 may be made of any flexible type of string, wire or plastic and preferably are made to be just slightly resilient to maintain a light degree of tension in the belt when its ends are hooked onto finger gripper 43 so that the belt can be moved to adjust the position of slider 38 but has sufficient frictional engagement in its track to maintain a given setting once the hooked end 45 of element 46 has been adjusted into the desired position. The friction within the slider 38 and endless belt device 40 must be sufficient to resist the urge of the stretched taut resilient element 46 to produce a change in the setting of slider 38. Thus the frictional characteristic built into the belt mechanism is related to the resilience of the stretched element 46 so that the slide 38 will always remain set in a given position.

The device described above may be used in various ways in economic research to study economic data, such as prices, incomes, wages and bank debits. For this, the student needs a sound theoretical framework for looking at the data, and a number of economic experiences to draw upon. Computer technology lends a hand by manipulating the data singled out by economic theory and economic experience. The above steps of economic research seem reasonably straightforward, but the truth is that a number of complications are usually picked up along the way. The particular display shown in FIG. 1 illustrates just one of these problems.

Multicollinearity is a term taken from the subject of econometrics. What is really indicated is a particular measurement difficulty that can arise when we examine the relationship between a number of economic variables. Consider the relationship, $Y=f(X,Z)$, where $X$ and $Z$ are designated independent variables, and we wish to examine their influence on $Y$, the dependent variable. The collected raw data on these three variables is subjected to a linear multiple regression "run" on the computer, resulting in the "fitted line" $\hat{Y}=\hat{a}+\hat{b}_1 X + \hat{b}_2 Z$ where $\hat{Y}, \hat{a}, \hat{b}_1$ and $\hat{b}_2$ are estimates of the existing relationship (for the purposes of illustration I have left out any consideration of an error factor). This information establishes a picture of the way in which $X$ and $Z$ combined, influence $Y$ but would be more useful if we could separate out the influences to show how the chosen independent variable $X$ influences $Y$ and also how the chosen independent variable $Z$ affects $Y$, in addition to knowing the combined influence of $X$ and $Z$ on $Y$. We are hampered in our attempt to separate out these influences when the so-called independent variables are actually closely dependent, one upon another. When this takes place what we have in econometric terms, is a case of multicollinearity.

As an example, suppose we begin with a particular set of time-series data on these three variables; $Q$ (representing quantity demanded of a particular good); $P$ (representing prices of the particular good) and $Y$ (representing incomes of the consuming units. From theory and experience, we assume the relationship, $Q=f(P,Y)$. Next, we submit the raw time-series data to a multiple regression "run" and the computer prints out, $\hat{Q}=\hat{1}P+\hat{1/3}Y$ where $\hat{1}$ and $\hat{1/3}$ are the estimated egression coefficients $\hat{b}_1$ and $\hat{b}_2$. We run a second regression, his time assuming $Y=f(P)$ and we get back, using our original lata, the precise linear relationship $\hat{Y}i=-15+3\hat{P}$ We further ry a regression of $P$ on $Y$ and the printout is $\hat{P}=5+1/3Y$. What s evident here is that close interdependence between $Y$ and $P$ s present, where independence was assumed.

A table of some of the computed values for $Q$ $P$ and $Y$ appears as follows, and if treated as actual observed values, roduce a raw observation line that is identical to the regresion line;

| Q | P | Y |
|---|---|---|
| 5 | 5 | 0 |
| 7 | 6 | (P,Y), |
| 9 | 7 | 6 |
| 11 | 8 | 9 |
| 13 | 9 | 12 |

Note the uniform movement of all variables. Also, although we assumed $Q=f(P,Y)$, $Q=f(P)$ will give us the same $Q$ values. Recall that:

1. $Q=1P+1/3Y$
2. $Y=-15+3P$. Thus
3. $Q=1(P)+1/3(-15+3P)=2P-5$ and
4. $Q=f(Y)$ since $P=5+1/3Y$ So we have $Q=(5+1/3Y)+1/3Y=+2/3Y$ We note that, 3) gives as much information as 1), and 4) gives as much information as 1). Under the circumstances, the separate influences of $P+Y$ on $Q$ are blurred. This is a classic example of the multicollinearity problem.

Referring to FIG. 1, the first and lowest line 60 in the front of the box is a simple downward sloping demand curve. It is expressed by $P=10-Q$ and when income is zero the consumers choose a quantity of 5 because in this problem, the spending units may at times be nonearning units. As income rises, the successive demand lines 61, 62, etc., shift rightward and upward, as we move into the box.

The line 71 running through the middle of the diagram and resting on the lines 60, 61, 62, etc., represents the multiple regression equation $Qd=1P+1/3Y$, or($\hat{Q}d=1\hat{P}+1/3Y$). It is the main focus of the display and is intended to represent the problem of multicollinearity.

The dependency of $P$ on $Y$ is seen in the display as the rectangular line 80 running from front to back on wall 10 of the box across the back, along wall 11 and across the front of the box. $P=5+1/3Y$ is the explicit expression of this relationship. The line 90 that is positioned lower and to the right, is not vital to the multicollinearity problem, but is helpful for comparison purposes. It represents $Q=f(\overline{P},Y)$ where $P$ is held fixed (at 5). This allows students to focus on the way income shifts the demand curve outward, when price is not moving. The line 91 (upper left of the box) represents a case where $Q$ is held constant and price and income are allowed to vary, (useful here only for comparison purposes).

The multicollinearity concept represents a typical graphic display. A few of the areas that seem particularly well suited for visual representation in the device are as follows:

Macroconcepts
1. Determination of national income, (static and dynamic models).
2. The effect of tax changes, changes in government spending, and changes in investment, on the level of national income.
3. General equilibrium: the link between the money market and the commodity market.
4. International trade: principle of comparative advantage; balance of payments problems.
5. Various economic growth models.

Microconcepts
1. Linear programming, using two activities and four or five constraints.
2. Input-output analysis.
3. Solving systems of equations, using three variables. (A mathematical concept with several economic applications, particularly useful for microconcepts 1) and 2)).
4. Production function: returns to scale; diminishing returns; the impact of new technology (inventions etc.) on productivity and income.
5. The "cobweb" cycle. (A dynamic model involving demand, supply, and time as explicit variables).
6. Theory of the firm: examination of various markets; effect of different kinds of taxes on levels of production.

Econometrics
1. Multiple regression.
2. Identification.

In the following section, FIG. 3, we present a graphic display of G.N.P., which incorporates the attachment of FIG. 2. The major purpose of the attachment is to allow movement of one of the relationships to be graphically represented. The attachment makes possible an upward parallel shift, or a shift in depth (into the box). In the description that follows, the attachments are placed in a vertical position. However, as above described, when necessary, they can just as easily be placed horizontally or at varying angles. We can also show a change in the original linear relationship other than a parallel shift. For example, if we desire to show a rise or fall in the slope of the original linear relationship, the attachment allows for this.

Figure 3:
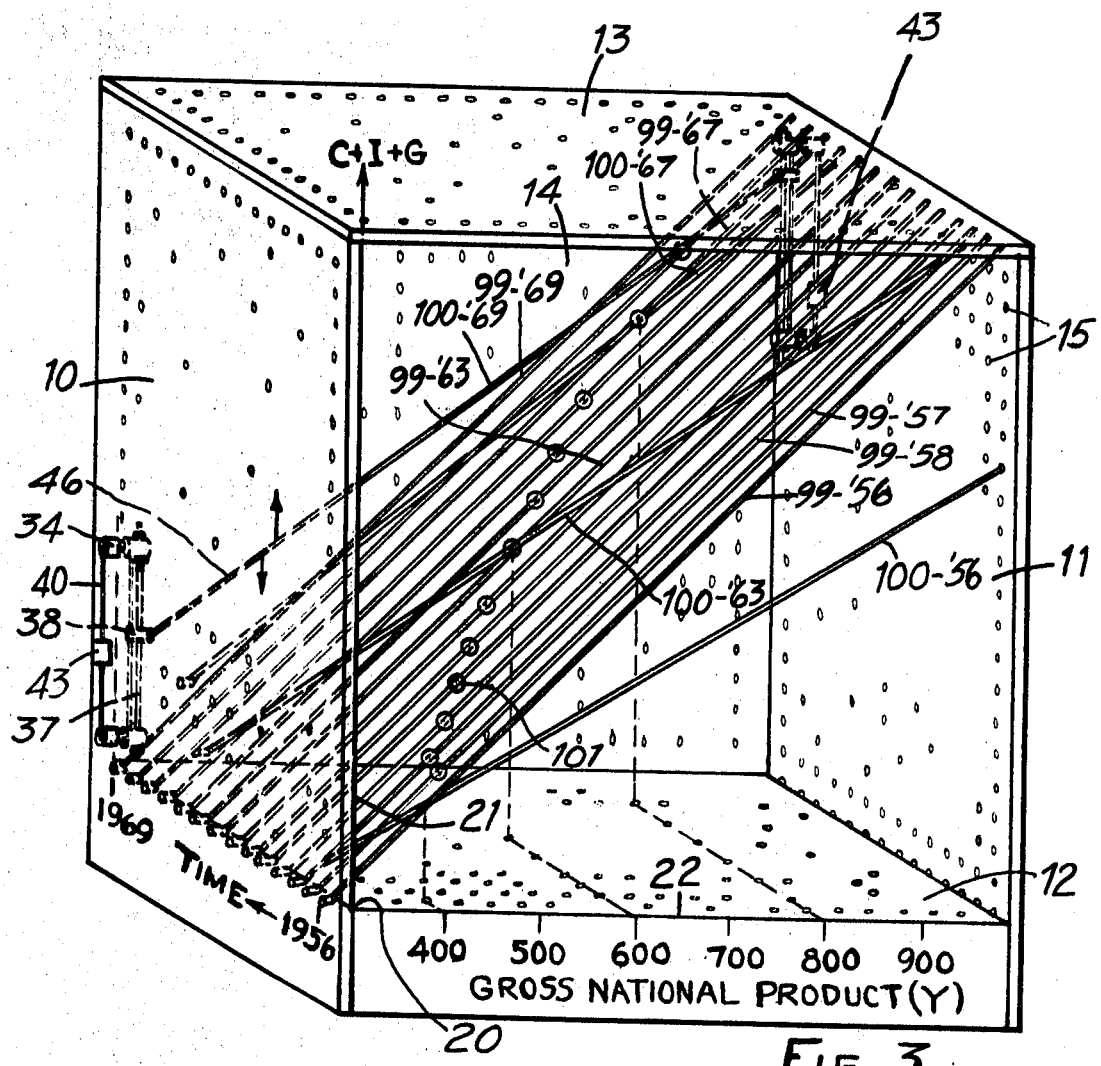
FIG. 3 is a Gross National Product display.
Figure 4:
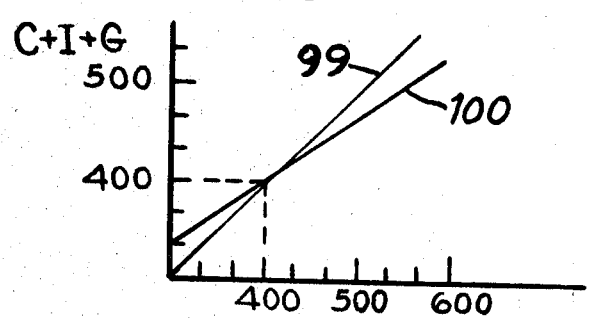
FIG. 4 is a representation of the year 1956 on the model shown in FIG. 3.

The Gross National Product display shown in FIG. 3 is a three-dimensional display that takes as its starting point, modern income analysis, as described in any standard college textbook on basic principles of economics. What is usually represented is a two-dimensional graph, as shown in FIG. 4, for one year with levels of Gross National Product (or alternately Net National Product) measured along the horizontal axis, and the major determinants of G.N.P. (i.e., consumption, investment and government expenditure) along the vertical axis. For example, assume the following theoretical model:

Model 1

(general)         (specific)
Consumption $=C=a+b(Y-T)=31+2/3(Y-T)$
wherein:
  $a$ is a theoretical statistical constant representing consumption at zero income, and
  $b$ is the slope constant of the consumption function that represents the change in $C$ in relation to the change in $Y$.
Domestic Investment (gross) $=\bar{Ig}$ $=67$
Government Exp. $=\bar{G}$ $=104$
Taxes $=\bar{T}$ $=109$
Exports $=\bar{X}$ $=23$
Imports $=\bar{Imp}$ $=20$
Domestic and Foreign Invest. $=\bar{I}$ $=70$
G.N.P. (at equilibrium) $=Y=C+Ig+(X-M)+G$ $=400$ All components of this simplified model of FIG. 4 are treated as independent, with the exception of Consumption. The line 99–'56 represents the equilibrium point where production and demand are equal. The line 100 represents the total G.N.P. The slope of the $C+I+G$ line 100 is determined by the slope of the consumption function, such as $C+I+G = 133 + 2/3 Y$.

In the display of FIG 3 we add a third dimension (i.e., time) to the first two dimensions depicted above. The most frequently used models, in basic economics texts, are static (such as the model illustrated in FIG. 1). In a static model illustration the student can simply focus on the position of G.N.P. equilibrium at different time periods, without attempting to explain how G.N.P. at time period 1 may have affected G.N.P. at time period 2 etc.

It is also evident that time can be treated as an explicit variable. Thus, we can theorize differently and transform a static model into a dynamic model and still have a display to represent such a model as will appear more fully below.

On FIG. 3, for example, the first period is 1956 and here we use the hypothetical model indicated by lines 99 and 100 in FIG. 4. Although the model is theoretical, the equilibrium level of G.N.P. (i.e., 400) is close to the actual 1956 G.N.P. of 419 billion.

As we move into the box, the actual levels of G.N.P. for the years 1957, '58, '59, '60, '61, '62, '64, '65 and '68, are determined by the intersection of the equilibrium line with the $C+I+$ line, that can be marked on the successive lines 99–'57, 99–'58 etc. with a bead 101 that can be slidably mounted on each of the elements 99–'56, 99–'57 etc. The beads 101 can easily be moved up and down their respective red lines if desired in a given display. A useful addition to the above display would be a second series of beads of a different color, depicting levels of real G.N.P. (i.e., G.N.P./price index). With 1956 as a base period (1956 index=100) the new set of beads if used would appear on the lines 99–'56, 99–'57 etc. in the display lower and to the left of the beads 101. Such a display would offer the viewer a graphic view of the problem of inflation in recent years.

Lines 100–'63 and 99–'63 represent a theoretical model for the year 1963. Again all FIGS. used are actual, with the exception of those in the consumption function. Actual G.N.P. (590 billion) is reasonably close to the model's theoretical 600. An upward drift (or shift) over time in the consumption function is evident when 1963 is compared with 1956. Upper level students can usefully explore (and check through their own empirical testing), the relationship between the short-term consumption function (relatively flat in slope) and the long-term consumption function (relatively steeper sloped). This display offers a valuable base for examining and discussing this problem.

The third model illustrated by 100–'67 and 99–'67 focuses attention on the effect of a change (an upward move) in the slope of the consumption function (and hence the slope of the $C+I+$ function.

In the model for 1963—$C=a+2/3(Y-T)$
In the model for 1967—$C=a^1+(Y-T)$
Where $a$ and $a^1$ represent the values of the constant in the respective functions.

The effect of a change in the pattern of consumer spending is thus illustrated in the move from 1963 to 1967.

Where computer facilities are available, all of the models mentioned here, plus many more that are consistent with the display may be tested empirically by the student. This would appear to be a most useful way to bridge the gap between economic theory and practice. Also, it should be pointed out that these models can be varied, and still remain consistent with the display.

For example in the model for 1967, we could reformulate the model as follows:
1. $C=a^{11}+0.66(Y-T)$
2. $Ig=0.14Y$
3. $T=T;\ G=\bar{G};\ X=\bar{X};\ Imp=\bar{Imp}$ Alternatively, we could theorize:
1. $C=a^{111}+15/20(Y-T)$
2. $Imp=1/20(Y)$
3. $T=\bar{T};\ G=\bar{G};\ X=\bar{X};\ Ig=\bar{Ig}$ and for an example of a dynamic model, model I could become:
$C_t=a+b(Yt_11-Tt_11)$
$I_{at}=\bar{I_{gt}}$
$G_t=\bar{G_t}$
$T_{t1}=\bar{T_{t1}}1$
$X_t\ \bar{X_t}$
$Imp_t=\bar{Imp_t}$
G.N.P. (at equilibrium)$=Y_t=C_5\frac{1}{2}_t+(X_t-Imp_t)+G_t$ Where $t$ represents the present period, (e.g. 1969) and $t-1$, the period just prior to the present period, (1968). As long as a rearrangement of the model leaves the slope of the total $C+I+$ function, as well as the equilibrium level of G.N.P., (which we have deliberately made close to the actual G.N.P.) unchanged, changes in a number of individual components of the model can be made, in agreement with the display.

Lines 100–'69 and 99–'69 represent the model for the year 1969. The line 100–'69 is made of elastic material and corresponds to resilient element 46 of FIG. 2 and is fitted to the attachment shown in FIG. 2. We can use the attachment to shift the $C+I+G$ line upward or downward, or change the slope of the $C+I+G$ line. Assume, for example, that we would like to consider the impact of a tax rise on consumer spending for 1969. By raising the tabs 43 on the right and left side of the box, (tax rise) we cause a downward shift in the $C+I+G$ line FIG. 3. Assume that initially the tax rise does not affect the slope of the $C+I+G$ line, but simply shifts it downward. However, realistically consumers may react to a tax rise by cutting down on saving or raising the fraction of after-tax income, they wish to spend. We can demonstrate this by lowering only the finger tab 43 on the right side of FIG. 3. This raises the slope of the $C+I+G$ ($b$ to $b_1$), due to a rise in $\Delta C/\Delta Y$.

An increase or decrease in investment, imports or government spending, or a change in the slope of $C+I+G$ arising from any change consistent with the variables represented in the display, can be demonstrated similarly. All the above-indicated changes, can be illustrated easily and the relative effect of one on the other can be shown by making use of the attachment. If a dynamic model is used, the attachment shown in FIG. 2 may be fitted at an angle, if desired, so that time can more explicitly be incorporated into the model.

In FIG. 3 I have illustrated the movement of one relationship. This requires a pair of attachments, one on the right side and one on the left. If a given demonstration needed to show more movable linear (or nonlinear) relationships, additional pairs of attachments would be needed.

The above description covers the construction and use of the preferred form of my device, it is possible that modifications thereof may occur to those skilled in the art, which will fall within the scope of the following claims.

I claim:

1. An assembly for teaching economics by illustrating the independent relationship in a set of linear equations of a number of independent variables and their effect on dependent variables comprising a transparent generally cubical structure having top, bottom, side and back walls, said walls being perforated in a uniform pattern with the holes all equidimentionally spaced one from another, movable mounting means supported on the inside of at least one of said walls, said movable means being adjustable to occupy positions between certain of the holes in said wall, and a plurality of elongated flexible means adapted to be stretched taut between the inside walls of said structure, at least one of said elongated means being provided with means for attachment at at least one of its ends to said adjustable movable means and at its other end to another wall to illustrate a particular linear equation, the certain holes being selected to represent at least one of the coordinates of the particular linear equation being represented, and said adjustable means changing the representation indicated when moved in order to illustrate the effect of changing values in the illustrated linear equation with relation to the overall picture.

2. A device according to claim 1 wherein movable mounting means for said flexible means are supported on oppositely disposed walls of said structure and the opposite ends of certain of said flexible means are connected thereto whereby to illustrate the effect of changing values with relation to the overall picture.

3. A device according to claim 1 wherein said movable mounting means includes an endless belt for carrying the mounting means and said belt being adapted to be adjustably positioned to occupy different settings.

4. A device according to claim 2 wherein each of said movable mounting means includes an endless belt having a portion inside the cubical structure and a portion outside the cubical structure for carrying the mounting means, and each of said belts is adjustably positioned to occupy different settings.

5. A device according to claim 3 wherein different portions of said endless belt are adapted to pass through spaced-apart perforations in said wall, said movable mounting means being positioned on said belt on the inside of the cube and being adjustably positioned by movement of the belt from outside the cube.

6. A device according to claim 4 wherein different portions of each of said endless belts pass through spaced-apart perforations in the respective walls with which each belt is associated, and said movable means are positioned on each belt on the inside of the cube and being adjustably positioned by movement of its respective belt from outside the cube.

7. A device according to claim 2 wherein endless belt means occupy paths adjacent each of said opposite walls, the path of each belt means at its respective wall including a passage through two spaced-apart holes so that each of the endless belt means has a portion inside the cube and a portion outside the cube, said belt means being oscillatable in said path, said movable mounting means including elements that art carried on said inside portion of each of said endless belts respectively to effect said changes by manipulating the outside portion of said belt means.